(No Model.)
S. T. ROBERTSON.
STEAM COOKING UTENSIL.
No. 593,691. Patented Nov. 16, 1897.
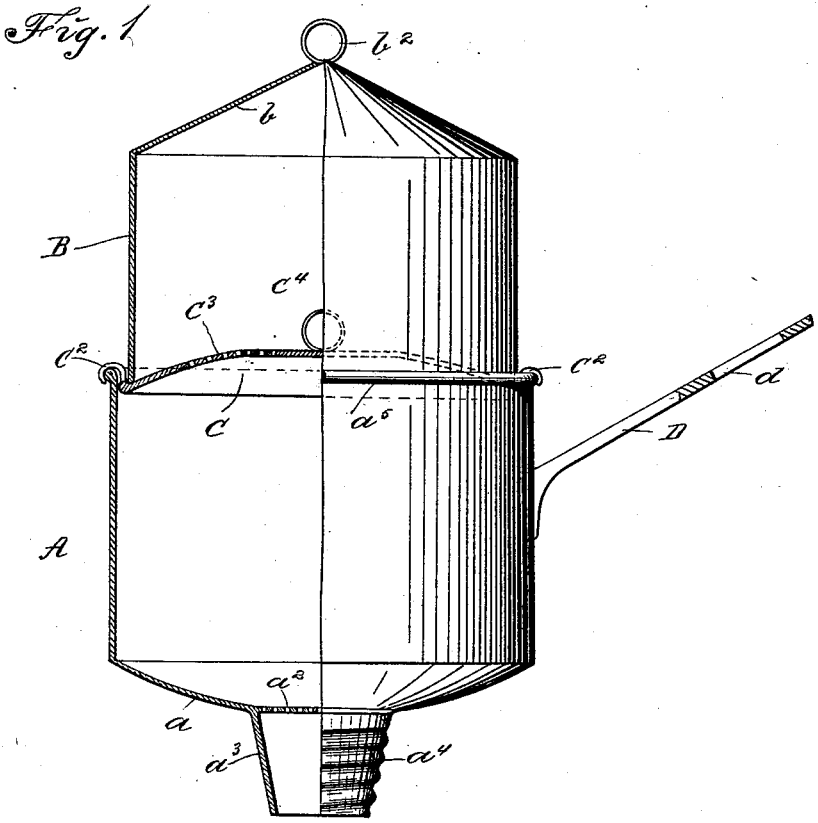
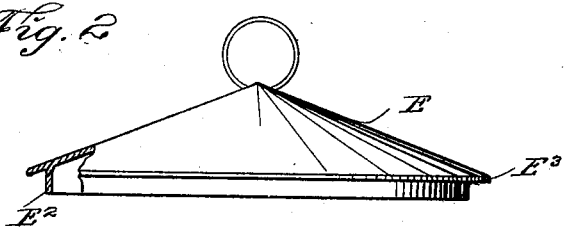
WITNESSES:
C. Nordfors
C. Gerst
INVENTOR
Sara Thacher Robertson.
BY
Edgar Tate & Co.
ATTORNEYS.

UNITED STATES PATENT OFFICE.

SARA THACHER ROBERTSON, OF CANTON, NEW YORK.

STEAM COOKING UTENSIL.

SPECIFICATION forming part of Letters Patent No. 593,691, dated November 16, 1897.

Application filed April 23, 1897. Serial No. 633,435. (No model.)

*To all whom it may concern:*

Be it known that I, SARA THACHER ROBERTSON, a citizen of the United States, residing at Canton, in the county of St. Lawrence and State of New York, have invented certain new and useful Improvements in Steam Cooking Utensils, of which the following is a full and complete specification, such as will enable those skilled in the art to which it appertains to make and use the same.

This invention relates to steam cooking utensils such as are usually employed for cooking vegetables, meats, and other articles by means of steam from a kettle or boiler; and the object of the invention is to provide an improved device of this class which is simple in construction and operation and well adapted to accomplish the result for which it is intended, while being comparatively inexpensive.

The invention is fully disclosed in the following specification, of which the accompanying drawings form a part, in which—

Figure 1 is a side view, partially in section, of my improved cooking utensil; and Fig. 2, a sectional side view of a lid or cover which I employ.

In the drawings forming part of this specification the separate parts of my improvement are designated by letters of reference in each of the views, and in the practice of my invention I provide a cooking utensil of the class herein specified which is adapted to be connected with a teakettle or any other suitable kettle or boiler and which consists, preferably, of two parts—a main or bottom part A and an upper detachable part B. The main or bottom part A is cylindrical in form and open at the top, and the bottom thereof is slightly downwardly curved, as shown at $a$, and the central portion thereof is perforated, as shown at $a^2$, and formed around the central perforated portion of the bottom of the main or bottom part of the utensil is a depending annular flange or rim $a^3$, which is preferably slightly conical in form and the walls of which are preferably corrugated, as shown at $a^4$, so as to give strength thereto, it being understood that the cooking utensil is composed of sheet metal or similar material. The rim or flange $a^3$ constitutes, in effect, a downwardly-directed tubular extension, by means of which the utensil may be connected with the kettle, above which it is supported when in operation, and the upper end of the bottom portion A is also preferably beaded, as shown at $a^5$.

I also provide a cover C for the bottom portion A of the utensil, and this cover is convex on its upper side and concave on its lower side and is so formed as to fit within the top of the lower portion A of the utensil and is provided with hooks $C^2$, which rest on the top of the lower portion A and holds it in place. Any desired number of these hooks may be employed, and the entire perimeter of the cover C may be so formed as to rest on the top of the bottom portion A of the utensil, and the cover C is perforated around the central portion thereof, as shown at $C^3$, and is provided centrally with a ring or handle $C^4$.

The upper portion B of the utensil is also cylindrical in form, and the lower end thereof is open and of such size as to fit within the bottom portion A and rests on the perimeter of the cover C, as clearly shown in the drawings, and the said upper portion B is closed at the top, as shown at $b$, and the top thereof is preferably conical in form and is also provided with a ring or handle $b^2$. The bottom portion A is also provided with a handle D, and said handle is provided with an opening $d$, by which the utensil may be suspended from a hook or nail when not in use, and the upper portion B of the utensil may be placed in the lower portion when the device is not in use, and the operation will be readily understood from the foregoing description when taken in connection with the accompanying drawings and the following statement thereof.

The device is connected with a teakettle or other kettle in the usual manner, and the articles to be cooked are placed in the part A or in both parts, if desired, it being understood that the part A may be used separately or both parts may be used together when necessary, and steam rises into the bottom part A and comes in contact with the material placed therein and passes through the cover C thereof into the part B and comes in contact with the material placed therein, if said upper part is employed, and by means of this device vegetables, meats, and other articles may be quickly and easily cooked, as will be readily understood.

In Fig. 2 I have shown a supplemental cap or cover E, which is designed to be used as a cover for the bottom portion A of the cooking utensil when the upper portion B is not employed, and said cover is provided with a depending annular flange $E^2$, which fits within the top of the lower part A of the cooking utensil, and with an annular rim $E^3$, which rests thereon. I may also form the bottom portion of the upper part B so as to rest upon the lower part A and form a cover therefor, as will be readily understood, and other changes in and modifications of the construction herein described may be made without departing from the spirit of my invention or sacrificing its advantages.

Having fully described my invention, I claim as new and desire to secure by Letters Patent—

The herein-described steam cooking utensil, consisting of a bottom and top part A and B, respectively, the bottom part being provided with a downwardly-curved bottom which is perforated centrally thereof and provided with a depending tubular extension, a perforated cover mounted on said bottom part, the same being so proportioned that the perimeter thereof is adapted to fit within said bottom part and provided with hooks by which it is secured to the top thereof, and the top portion being open at the bottom, and being adapted to slidably fit in said bottom part and being supported thereon by means of said perforated cover and hooks, substantially as and for the purpose described.

In testimony that I claim the foregoing as my invention I have signed my name, in presence of the subscribing witnesses, this 19th day of April, 1897.

SARA THACHER ROBERTSON.

Witnesses:
D. M. ROBERTSON,
H. M. FARMAN.